(12) United States Patent
Kong et al.

(10) Patent No.: US 7,714,843 B1
(45) Date of Patent: May 11, 2010

(54) COMPUTER INPUT DEVICE WITH A SELF-CONTAINED CAMERA

(75) Inventors: Yuan Kong, Kirkland, WA (US); Zhengyou Zhang, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 423 days.

(21) Appl. No.: 10/434,277

(22) Filed: May 9, 2003

(51) Int. Cl.
 G09G 5/00 (2006.01)
 G09G 5/08 (2006.01)
 G06F 3/033 (2006.01)
 G06F 3/041 (2006.01)
 G06K 11/06 (2006.01)
 G08C 21/00 (2006.01)
 G06F 3/042 (2006.01)

(52) U.S. Cl. ............... 345/166; 178/18.01; 178/18.02; 178/18.03; 178/18.09; 178/18.11; 178/19.01; 178/19.05; 345/156; 345/157; 345/158; 345/163; 345/179; 345/180; 345/181; 345/182; 345/183

(58) Field of Classification Search ............ 345/166, 345/156–158, 163, 179–183; 178/18.01–18.03, 178/18.09, 18.11, 19.01, 19.05
See application file for complete search history.

(56) References Cited

U.S. PATENT DOCUMENTS

| 5,138,304 | A | * | 8/1992 | Bronson ................ 345/157 |
| 5,388,059 | A | * | 2/1995 | DeMenthon ............ 702/153 |
| 5,633,691 | A | * | 5/1997 | Vogeley et al. .......... 348/771 |
| 5,850,058 | A | * | 12/1998 | Tano et al. ............. 178/18.01 |
| 6,127,990 | A | * | 10/2000 | Zwern ..................... 345/8 |
| 6,295,051 | B1 | * | 9/2001 | Kanevsky et al. ........ 345/163 |
| 6,392,632 | B1 | * | 5/2002 | Lee ........................ 345/158 |
| 6,417,840 | B1 | * | 7/2002 | Daniels ................... 345/158 |
| 6,525,306 | B1 | * | 2/2003 | Bohn ....................... 250/221 |
| 6,627,870 | B1 | * | 9/2003 | Lapstun et al. .......... 250/221 |
| 6,698,897 | B2 | * | 3/2004 | Hamana et al. .......... 353/42 |
| 6,727,885 | B1 | * | 4/2004 | Ishino et al. ............ 345/156 |
| 2003/0052859 | A1 | * | 3/2003 | Finley .................... 345/156 |
| 2003/0067441 | A1 | * | 4/2003 | Hamana et al. ......... 345/156 |
| 2003/0132912 | A1 | * | 7/2003 | Hamana et al. ......... 345/156 |
| 2003/0169233 | A1 | * | 9/2003 | Hansen .................. 345/158 |
| 2003/0179183 | A1 | * | 9/2003 | Lee ........................ 345/163 |

OTHER PUBLICATIONS

Picture of pen emitting light in closed position, unknown manufacturer, 1 photosheet, date unknown but prior to the filing of the present application.
Picture of pen emitting light in open position, unknown manufacturer, 1 photosheet, date unknown but prior to the filing of the present application.

(Continued)

*Primary Examiner*—Alexander S Beck
(74) *Attorney, Agent, or Firm*—Merchant & Gould P.C.

(57) ABSTRACT

A method and system for visually tracking a point of contact of an optical output from a computer input device includes an internal camera configured to visually track the point of contact of the optical output against a surface and an optical source to transmit the optical output from the computer input device. The camera also transmits the position of the point of contact as a computer input. In one form, the computer applies the position of the point of contact as an input to an application operating on the computer, such as a gaming application. In one form, the camera can visually track the movement of the computer input device along a surface.

14 Claims, 13 Drawing Sheets

OTHER PUBLICATIONS

Dietz, Paul and Leigh, Darren, "DiamondTouch: A Multi-User Touch Technology", Nov. 11-14, 2001, pp. 219-226.

Rekimoto, Jun, "SmartSkin: An Infrastructure for Freehand Mainpulation on Interactive Surfaces", vol. No. 4, Issue No. 1, Apr. 20-25, 2002, pp. 113-120.

Motif and CDE 2.1 Style Guide, Printed on Mar. 14, 2003, 10 pages, (http://publib.boulder.ibm.com/doc_link/en_US/a_doc_lib/motif/motifsg/motifsg25.htm.

Motif 2.1 Programmer's Reference, Printed on Mar. 14, 2003, 9 pages, (http:publib.boulder.ibm.com/doc_link/en_US/a_doc_lib/libs/motiftr/virtualBindings.htm).

Gardner, W. David, "Putting Pen to Smart Paper", Your Window on IBM Innovation, think research, Printed on Mar. 27, 2003, 4 pages, http://domino.research.ibm.com/comm/wwwr_thinkresearch.nsf/pages/paper397.html.

Chase, Victor, "TransNote Transformation", Your Window on IBM Innovation, think research, Printed on Mar. 27, 2003, 4 pages, http://www.research.ibm.com/thinkresearch/pages /2001/20010515_transnote.shtml.

"IBM ThinkPad TransNote", Printed on Mar. 27, 2003, 6 pages, http://www.pencomputing.com/frames./textblock_transnote.html.

"Sharp Corporation and Gyration Develop Motion-Sensing Projector Remote", Printed on Mar. 26, 2003, 2 pages, http://www.gyration.com/pr10.htm.

"No Desktop Required—Gyration Announces Cordless Optical Mouse for Use On and Away From the Desktop", Printed on Mar. 26, 2003, 2 pages, http://www.gyration.com/pr-ultra.htm.

"Gyration's Patented Technologies", Printed on Mar. 26, 2003, 2 pages, http://www.gyration.com/technology.htm.

"InterWrite School Suite", GTCO CalComp, Mar. 14, 2003, http://www.gtcocalcomp.com/interwriteschoolsuite.htm.

"quickTEMP Non-Contact Thermometer, Great for that aggressive drive through the hills and a must for the track", quickTEMP, Printed on Mar. 17, 2003, 2 pages, http://www.allroadster.com/mall/quickTEMP.htm.

"DW Graffiti", Printed on Mar. 17, 2003, 2 pages, http://www.cs.princeton.edu/~savraj/graffiti.php.

Drascic, David, "ARGOS Virtual Pointer", Printed on Mar. 14, 2003, 3 pages, http://vered.rose.utoronto.ca/people/david_dir/POINTER/POINTER.html.

Bourke, Paul, "Cross Correlation", Aug. 1996, 9 pages, http://astronomy.swin.edu.au/~pbourke/analysis/correlate/.

Belmont, M.R. and Savic, D., "Generalised Cross-Correlation Functions For Image Processing Applications.", Mar. 10, 1999, pp. 230-234.

"How Computer Mice Work", Howstuffworks, Printed on Mar. 17, 2003, 7 pages, http://computer.howstuffworks.com/mouse2.htm.

Sukthankar, Rahul; Stockton, Robert G.; and Mullin, Matthew D., "Smarter Presentations: Exploiting Homography in Camera-Projector Systems", Proceedings of International Conference on Computer Vision, 2001, 7 pages.

Garton, Brad and Dubois, Luke, "Columbia University Fall, 2002—G6610X, Computer Music", http://music.columbia.edu/cmc/courses/g6610/; http://music.columbia.edu/cmc/courses/g6610/syl.html; http://www.music.columbia.edu/cmc/courses/g6610/week4/.

"Interactive Large-Screen Displays for Command and Control", The Interactive Data Wall provides a high—resolution, large-screen display with wireless multi-modal interaction. (AFRL's Information Directorate, Information Systems Division, C4ISR Modeling and Simulation Branch, Rome NY), Printed on Mar. 17, 2003, 3 pages, http://www.afrlhorizons.com/Briefs/Sep01/IF0012.html.

Davis, James and Chen, Xing, "LumiPoint: Multi-User Laser-Based Interaction on Large Tiled Displays" Date unknown but prior to filing date of present application, 12 pages.

* cited by examiner

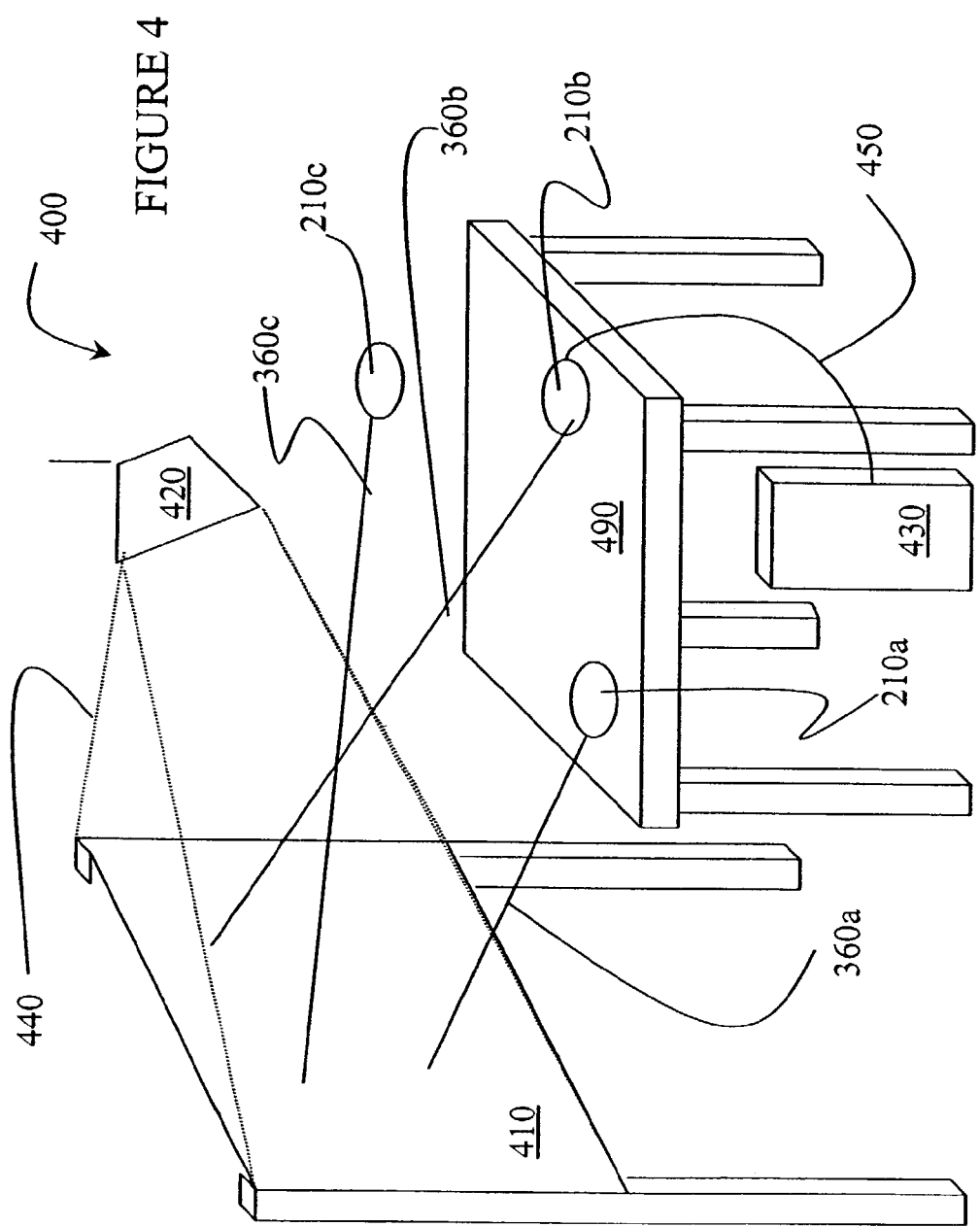

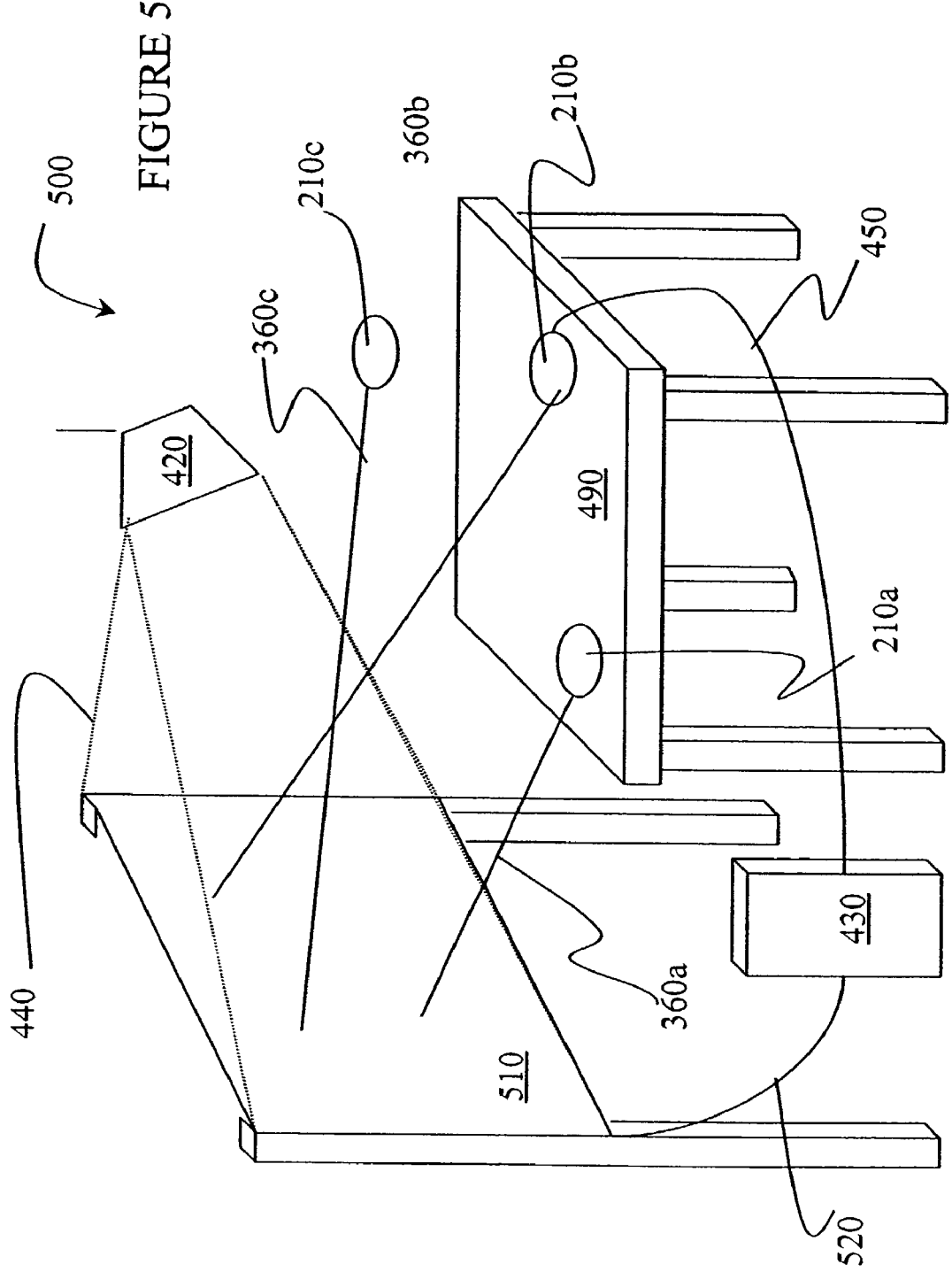

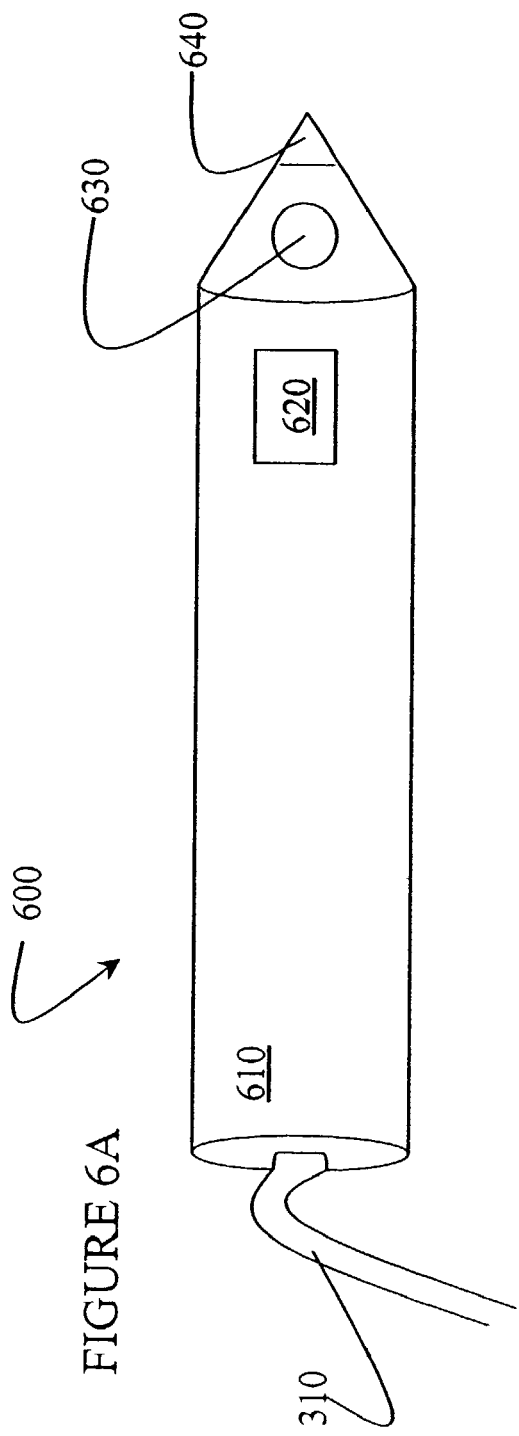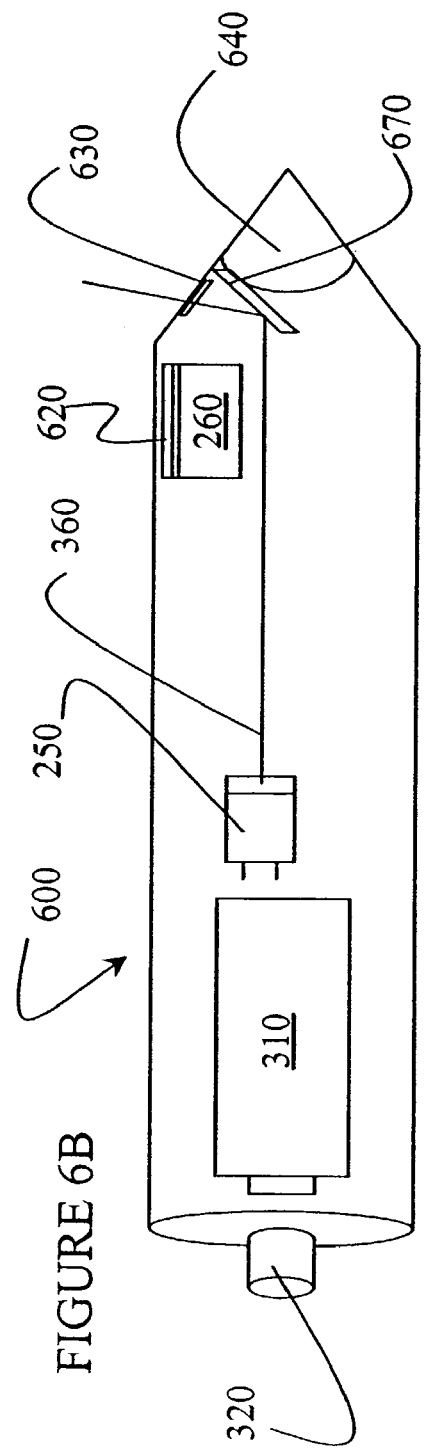
FIGURE 6A
FIGURE 6B

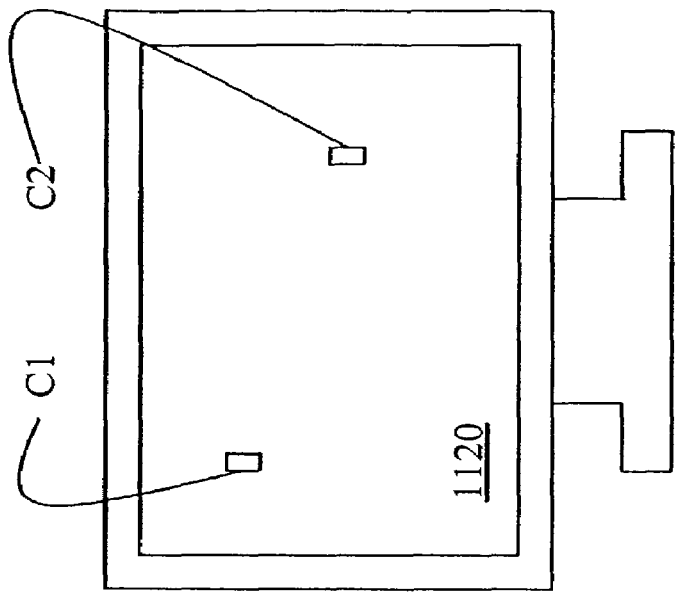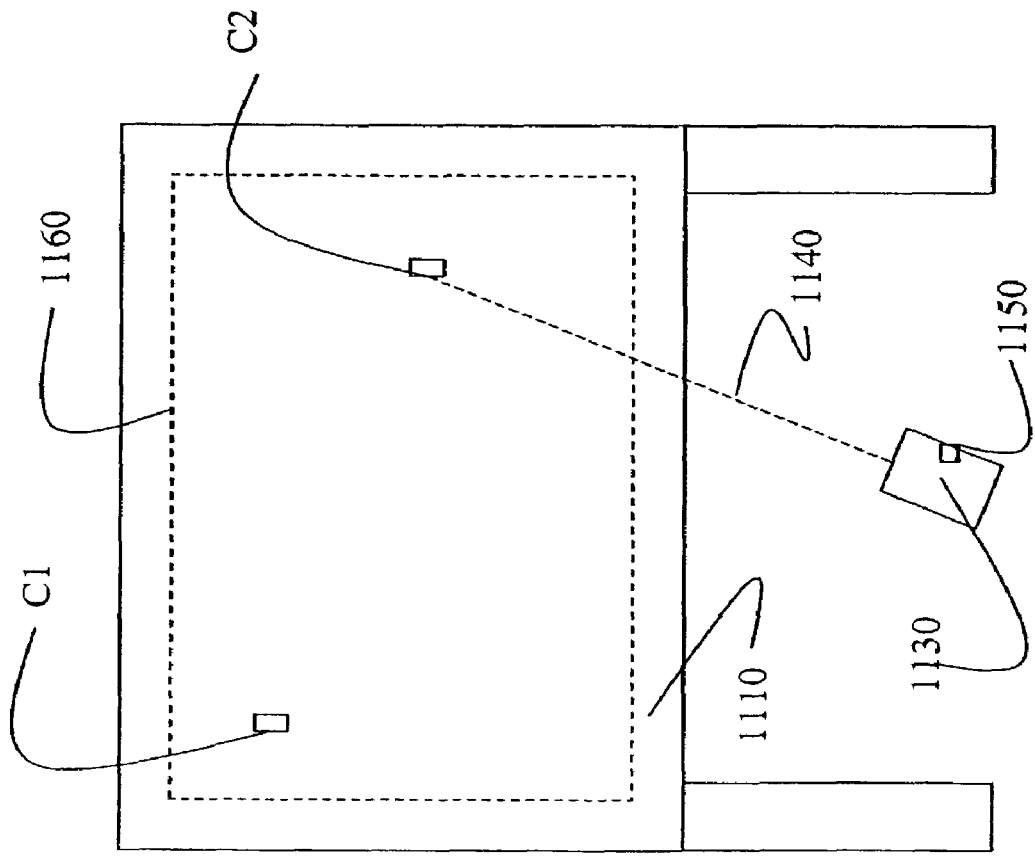
FIGURE 11

COMPUTER INPUT DEVICE WITH A SELF-CONTAINED CAMERA

FIELD OF THE INVENTION

Aspects of the present invention are directed generally to cameras utilized within input devices such as computer mice. More particularly, aspects of the present invention are directed to an input device with a built-in camera and optical source for tracking the motion of an optical output of the input device.

BACKGROUND OF THE INVENTION

Better interactive methods and devices are needed on a constant basis in the area of computer systems. However, there is always a concern to maintain an easy method or system for a user to implement what can often be very complex operations. Large screen technology has been one route taken in the area of interactive systems. These large screens have built in technology similar to that of a "touchpad" for laptops. The large screen can track a physical contact against its surface, allowing a motion to be inputted into some application, such as for drawing a box or moving a cursor. However, most of these systems allow only a single interface, i.e., touch, against its surface. Further, these systems fail to identify a particular user. If one user draws a circle, a second user could draw a different circle and the screen would not be able to distinguish the two users. Additionally, these large screens do not allow for simultaneous or spontaneous interactions. Large screens are also very sensitive to pressure applied against its surface and are often highly expensive.

Other touch-based and ultrasonic-based systems have been developed, but development in each of these technologies has inherent drawbacks as well. Alternative systems and methods are thus needed.

SUMMARY OF THE INVENTION

There is therefore a need for a computer input device tracking system that can track a point of contact of an optical output from a computer input device and transmit the position of the tracked point of contact as an input to a computer application. One aspect of the invention provides a computer input device that may include a power source, an optical output source, a camera, and an activation switch. The activation switch permits the transmission of an optical output from the optical output source and/or the storing of an image as seen within the field of view of the camera. The self-contained camera detects the point of contact of the optical output. The movement of the computer input device can also be tracked as the point of contact against the surface underneath the computer input device is tracked. The camera tracking system can be utilized with any type of surface, but the surface need not be coupled to a computer. Various characteristics of the point of contact of the optical output can be utilized to track the point of contact.

Another aspect of the invention provides an indicator as part of the computer input device. The indicator can inform, either aurally, visually, or a combination of both, the user of the computer input device that a camera, contained within the computer input device, cannot locate a point of contact of an optical output within its field of view or within a working field. Still another aspect allows for a computer input device with multiple cameras.

Another aspect of the invention provides a camera tracking system allowing multiple users to interact with a projected display in a computer coupled to a computer input tracking system to operate instructions based upon the positions tracked by the computer input tracking system. These and other features of the invention will be apparent upon consideration of the following detailed description of illustrative embodiments. Still other aspects of the present invention provide hopping cursor movement capability, enabling an easier navigation for a large display area and also provide "point and shoot" functionality for gaming applications.

BRIEF DESCRIPTION OF THE DRAWINGS

The foregoing summary of the invention, as well as the following detailed description of illustrative embodiments, is better understood when read in conjunction with the accompanying drawings, which are included by way of example, and not by way of limitation with regard to the claimed invention.

FIG. 4 is a schematic diagram of an illustrative embodiment of a computer input device tracking system with a surface in accordance with at least one aspect of the present invention;

FIG. 5 is a schematic diagram of an illustrative embodiment of a computer input device tracking system with an interactive surface in accordance with at least one aspect of the present invention;

FIGS. 6A-6B are schematic diagrams of illustrative embodiments of computer input devices in accordance with at least one aspect of the present invention;

FIG. 11 is a schematic diagram of an illustrative embodiment of an optical output device camera tracking system for use with a computer application in accordance with at least one aspect of the present invention.

DETAILED DESCRIPTION OF ILLUSTRATIVE EMBODIMENTS

In the following description of various illustrative embodiments, reference is made to the accompanying drawings, which form a part hereof, and in which is shown by way of illustration various embodiments in which the invention may be practiced. It is to be understood that other embodiments may be utilized and structural and functional modifications may be made without departing from the scope of the present invention.

Figure 1:
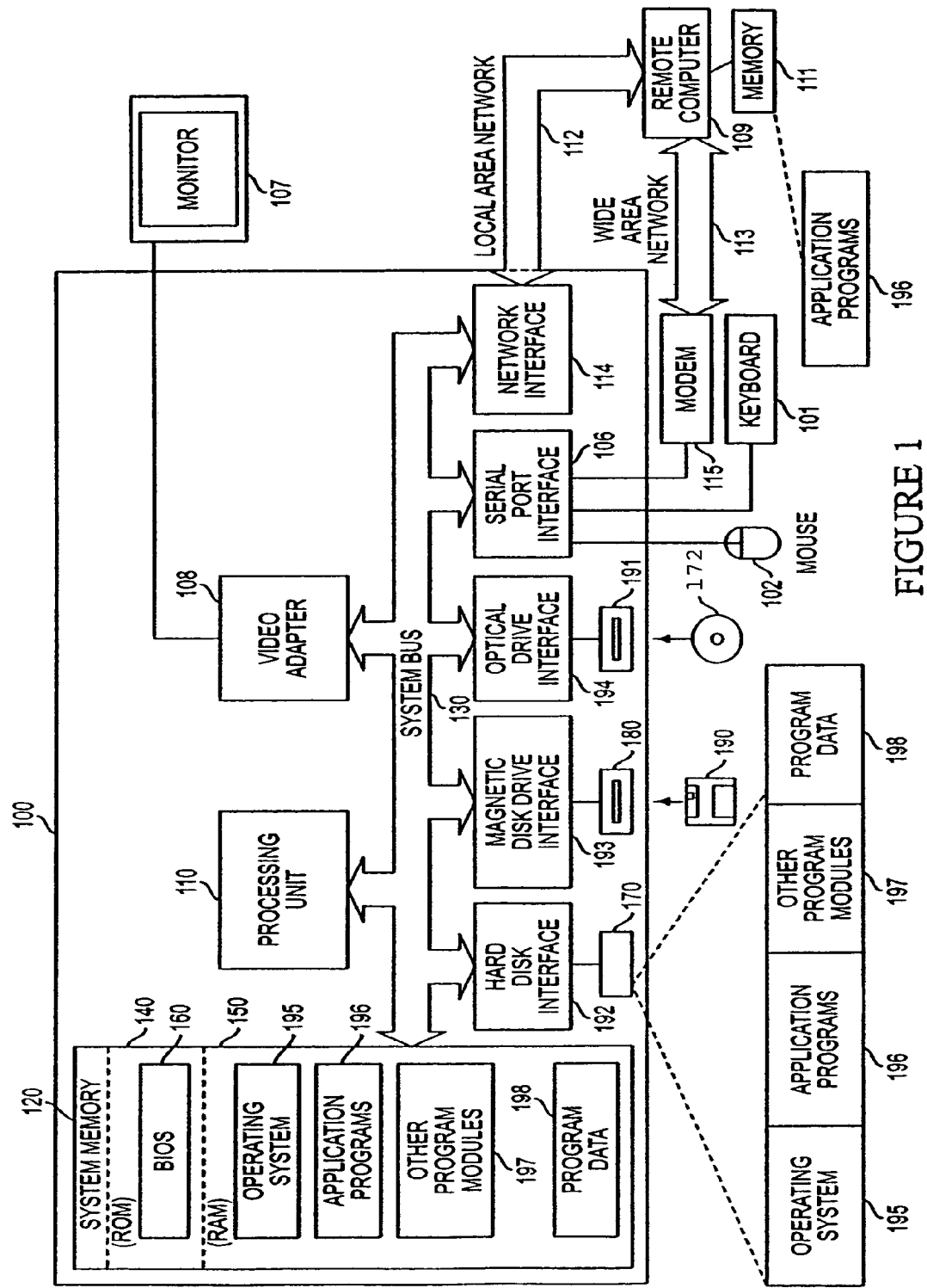
FIG. 1 illustrates a schematic diagram of a general-purpose digital computing environment in which certain aspects of the present invention may be implemented.

FIG. 1 is a schematic diagram of a conventional general-purpose digital computing environment that can be used to implement various aspects of the invention. Computer 100 includes a processing unit 110, a system memory 120, and a system bus 130 that couples system components including the system memory to the processing unit 110. The system bus 130 may be any of several types of bus structures including a memory bus or memory controller, a peripheral bus, and a local bus using any of a variety of bus architectures. The system memory includes read only memory (ROM) 140 and random access memory (RAM) 150.

A basic input/output system 160 (BIOS), containing the basic routines that help to transfer information between elements within the computer 100, such as during start-up, is stored in ROM 140. Computer 100 also includes a hard disk drive 170 for reading from and writing to a hard disk (not shown), a magnetic disk drive 180 for reading from or writing to a removable magnetic disk 190, and an optical disk drive 191 for reading from or writing to a removable optical disk 172 such as a CD ROM or other optical media. The hard disk drive 170, magnetic disk drive 180, and optical disk drive 191 are connected to the system bus 130 by a hard disk drive interface 192, a magnetic disk drive interface 193, and an optical disk drive interface 194, respectively. The drives and their associated computer-readable media provide nonvolatile storage of computer readable instructions, data structures, program modules and other data for the personal computer 100. It will be appreciated by those skilled in the art that other types of computer readable media which can store data that is accessible by a computer, such as magnetic cassettes, flash memory cards, digital video disks, Bernoulli cartridges, random access memories (RAMs), read only memories (ROMs), and the like, may also be used in the exemplary operating environment.

A number of program modules can be stored on the hard disk, magnetic disk 190, optical disk 172, ROM 140 or RAM 150, including an operating system 195, one or more application programs 196, other program modules 197, and program data 198. Any of the inventive principles described herein can be implemented in software and stored on any of the aforementioned storage devices.

A user can enter commands and information into the computer 100 through input devices such as a keyboard 101 and pointing device 102. Other input devices (not shown) may include a microphone, joystick, game pad, satellite dish, scanner, or the like. These and other input devices are often connected to the processing unit 110 through a serial port interface 106 that is coupled to the system bus, but may be connected by other interfaces, such as a parallel port, game port or a universal serial bus (USB). A monitor 107 or other type of display device is also connected to the system bus 130 via an interface, such as a video adapter 108. In addition to the monitor, personal computers typically include other peripheral output devices (not shown), such as speakers and printers.

The computer 100 can operate in a networked environment using logical connections to one or more remote computers, such as a remote computer 109. Remote computer 109 can be a server, a router, a network PC, a peer device or other common network node, and typically includes many or all of the elements described above relative to computer 100, although only a memory storage device 111 has been illustrated in FIG. 1. The logical connections depicted in FIG. 1 include a local area network (LAN) 112 and a wide area network (WAN) 113. Such networking environments are commonplace in offices, enterprise-wide computer networks, intranets and the Internet.

When used in a LAN networking environment, the computer 100 is connected to the local network 112 through a network interface or adapter 114. When used in a WAN networking environment, the personal computer 100 typically includes a modem 115 or other means for establishing a communications over the wide area network 113, such as the Internet. The modem 115, which may be internal or external, is connected to the system bus 130 via the serial port interface 106. In a networked environment, program modules depicted relative to the personal computer 100, or portions thereof, may be stored in the remote memory storage device.

It will be appreciated that the network connections shown are exemplary and other means of establishing a communications link between the computers can be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Figure 2:
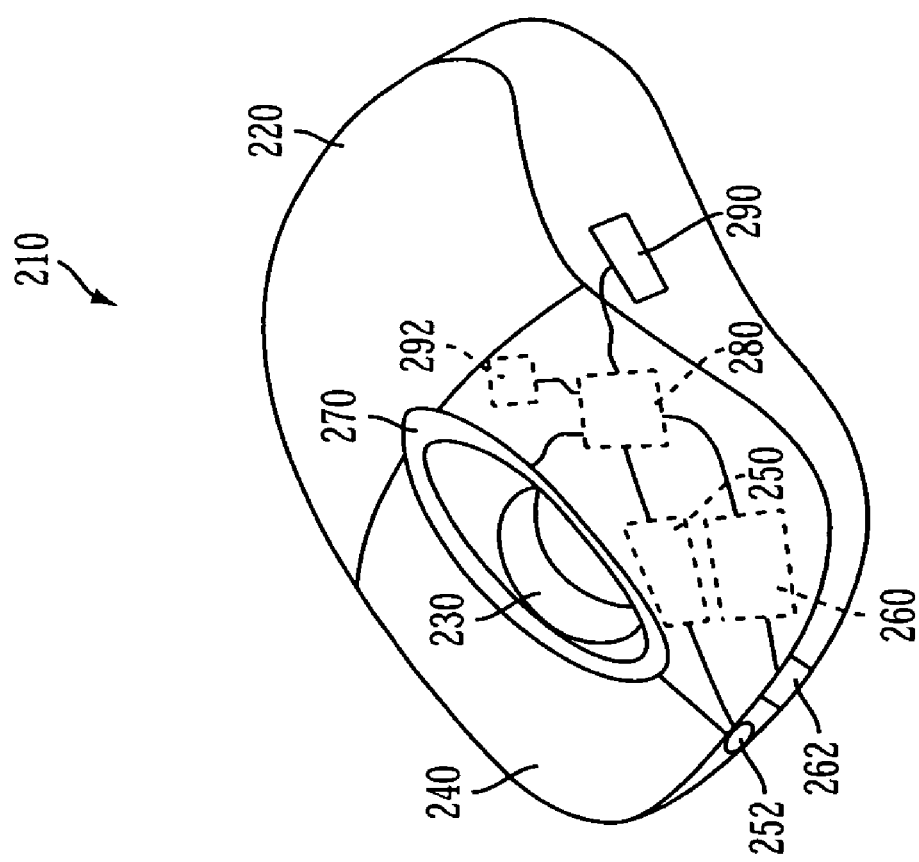
FIG. 2 is a schematic side view of a computer mouse with a camera configured with a field of view covering a surface in front of the computer mouse in accordance with at least one aspect of the present invention.

FIG. 2 is a side view of a computer input device 210 with a schematic representation of internal components. Computer input device 210 includes a housing 220. The bottom of the housing is a substantially flat surface that is arranged to rest on a supporting surface such as a desk or tabletop, but could also simply be held by a user. The upper portion of the housing 220 is shaped to comfortably interface with and support a human hand. Computer input device 210 further includes an indicator port 270. Indicator port 270 may be a transparent or translucent window, and may also be color tinted. Indicator port 270 is shown to encircle the cavity of the scroll wheel 230. It should be understood by those skilled in the art that indicator port 270 could be located at any of a variety of locations. Further, the indicator port 270 could be a speaker or opening that allows an audio alarm to be outputted. Computer input device 210 also includes an optical source 250 and a camera 260. The optical source 250 and camera 260 are coupled to a microprocessor 280. The camera 260 may include a lens and can be any of a variety of different types of cameras or image sensing systems. The optical source 250 may be a light emitting diode or laser diode among other types of optical sources, including an edge emitting laser, a vertical cavity surface emitting laser diode, and a resonant cavity light emitting diode and may output within the visible spectrum (400-760 nm) or the infrared spectrum (>760 nm). Different sources may be interchangeable as well for different application. For example, an infrared source may be utilized for relative tracking while a visible light source may be used for absolute tracking. Further, ports 252 and 262 for the optical source 250 and camera 260, respectively, are illustrated. The microprocessor 280 is also coupled to a computer mouse tracking component 292. The mouse tracking component 292 is configured to determine movement of the mouse relative to a supporting surface. The input device 210 also includes an action switch 290 for turning the various functions of the system on and off. The action switch 290 may be configured to enable the camera, the optical output, or both. Multiple action switches 290 could be included.

In FIG. 2, computer input device 210 is shown with an arrangement where the camera and the optical source are aligned to operate upon a surface in front of the computer input device 210. In use, computer input device 210 is connected to a computer (not shown) and provides signals to the computer to control a cursor or other screen image. As is known in the art, a computer input device may also contain one or more actuatable buttons 240, a scroll wheel 230, and/or other mechanisms for receiving user input and converting the same to signals for transmission to the computer. Computer input device 210 may communicate with and receive power from the computer via a wired connection (not shown), or may be wireless and receive power from a battery within computer input device (also not shown). Further, computer input device 210 also includes a rotor tracking ball or optical signal for tracking of the position of the input device.

Although not shown in FIG. 2, multiple cameras 260 could be used to make the camera tracking system of the computer input device have a higher resolution, and have a greater reduction in error. Further, it should be understood by those skilled in the art that the position of the optical source, camera, and/or indicator is not limited to the embodiment illustrated in FIG. 2. Computer input device 210 could also include a housing having two portions, a base portion and a wall portion. The base portion could be disposed to support the input device 210 on some type of supporting surface. The computer input device 210 could also include a movement tracking device configured to sense translational movement of the input device relative to the supporting surface. Finally, such a computer input device 210 could also include an optical source disposed to transmit light through the wall portion and a camera disposed to receive images through the wall portion.

Figure 3A:
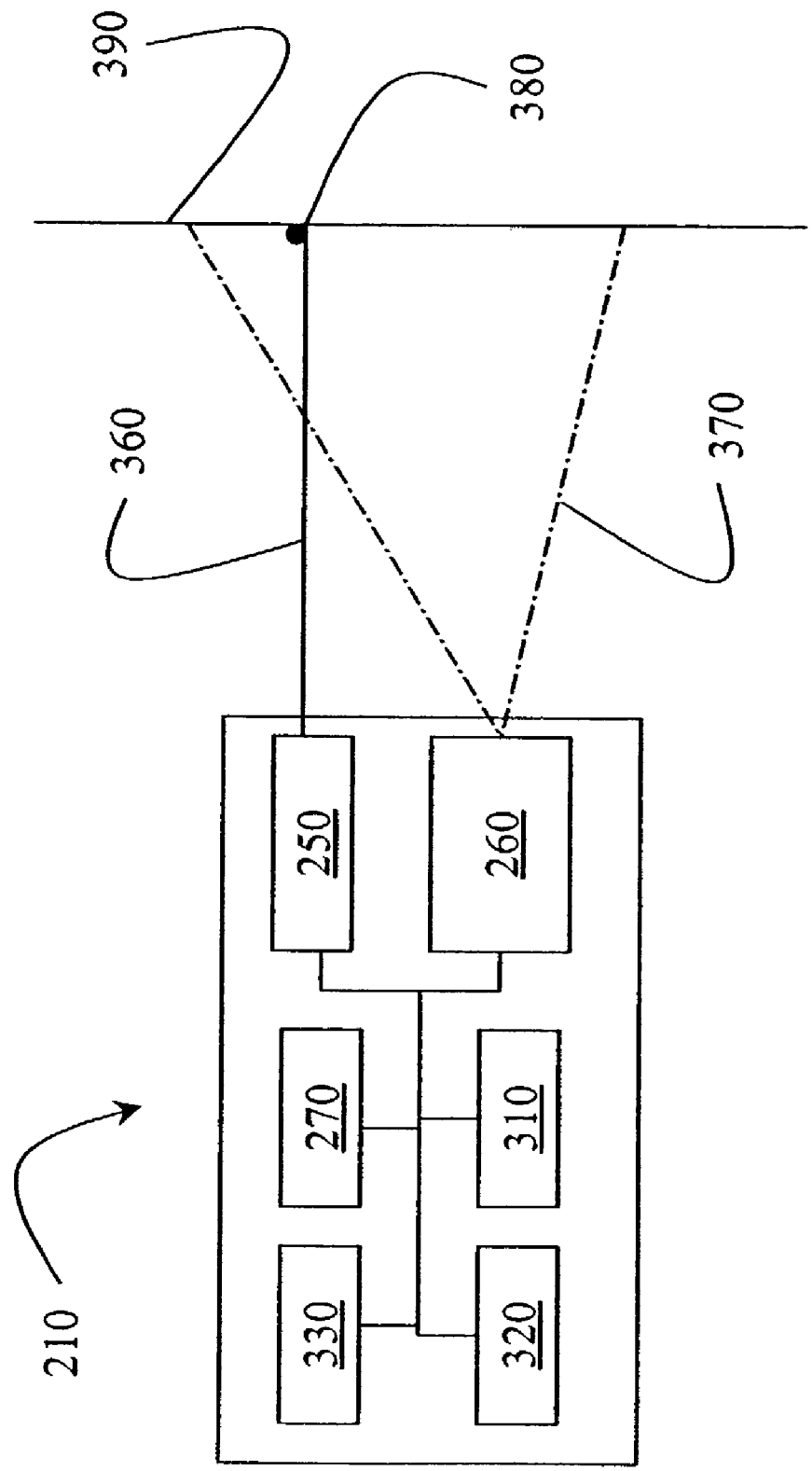
FIG. 3A is a functional block diagram of an illustrative embodiment of a computer input device for tracking a point of contact of an optical output in accordance with at least one aspect of the present invention.

Referring to FIG. 3A, an illustrative embodiment of a computer input device for visually tracking an optical output in accordance with at least one aspect of the present invention is shown. Again, computer input device 210 is shown with optical source 250, camera 260, and indicator warning 270. In operation, computer input device 210 outputs an optical output 360 from optical source 250. The optical output 360, i.e., a beam of light, reflects off a surface 390 such as a wall, and the camera 260 detects, within its field of view 370, the point of contact 380 of the optical output 360 against the surface 390. The computer input device 210 includes a power source 310, the optical source 250, an activation switch 320, electronics 330, and warning indicator 270. Warning indicator 270 may be an audio and/or visual indicator that is activated on the occurrence that the point of contact 380 of the optical output 360 is not within the field of view 370 of the camera 260 or within a working field. When the activation switch 320 is closed, power from the power source 310 is transferred to the optical source 250 to output the optical output 360 from the computer input device 210.

The surface 390 may be designed to include a working field, not shown. The working field is the active area of sensing for the camera 260 within the computer input device 210. The camera 260 can optically store a parameter or boundary by some type of optical recognition system. The camera 260 may be preprogrammed to recognize particular features of a boundary to indicate to the camera 260 where the bounds are for the working field. The field of view 370 of the camera 260 may be configured to sense the entire working field. The camera 260, via a microprocessor or a computer, can optically determine the working field. In the case where an optical output 360 is being tracked, a user may inadvertently pass through a boundary of the working field. In such a case, the warning indicator 270 can be enabled to indicate to a user that the working field is no longer in the field of view 370 of the camera 260.

Figure 3B:
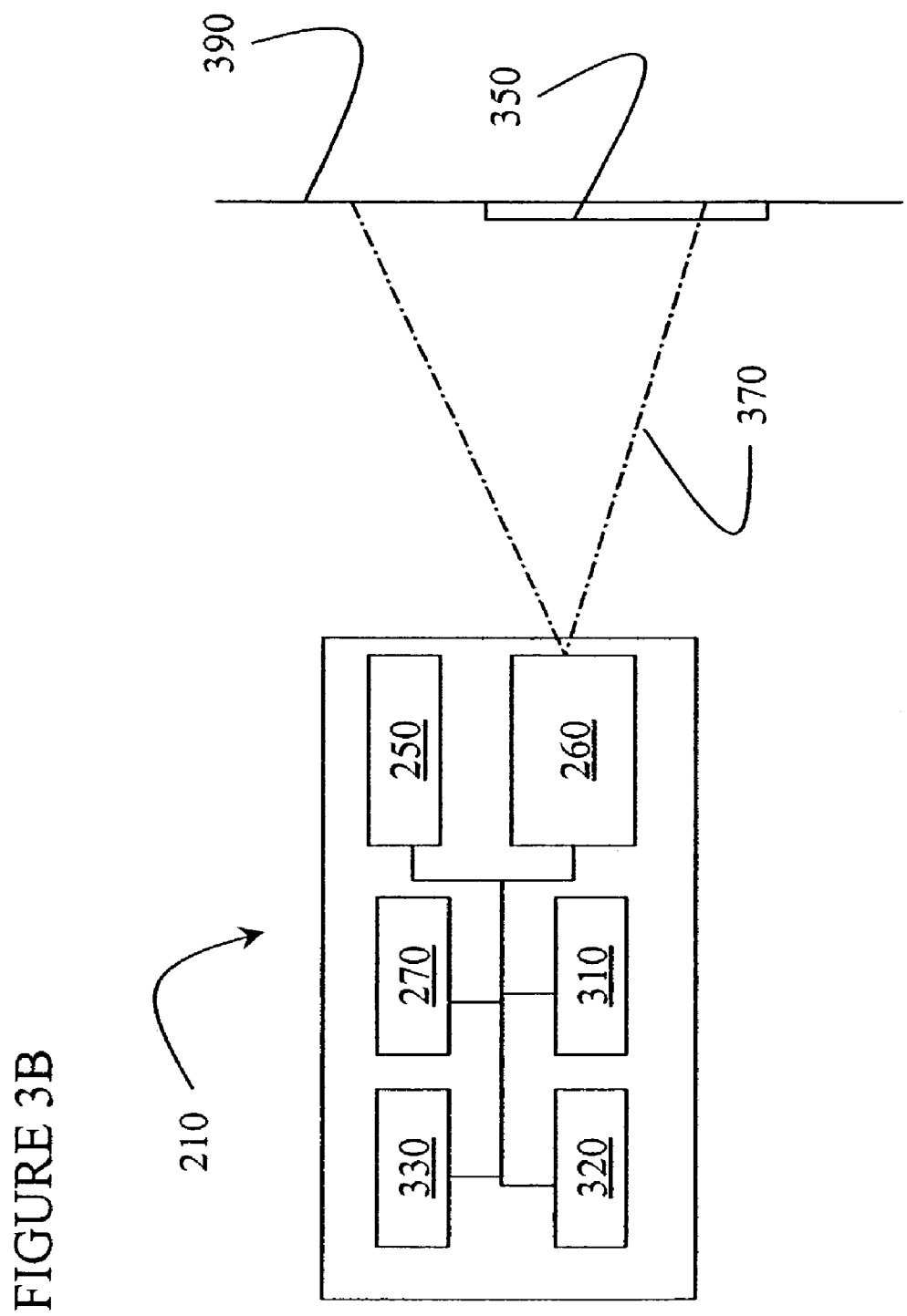
FIG. 3B is a functional block diagram of an illustrative embodiment of a computer input device for detecting a surface with a camera in accordance with at least one aspect of the present invention.

Referring now to FIG. 3B, an illustrative embodiment of a computer input device for detecting a surface with a camera in accordance with at least one aspect of the present invention is shown. Computer input device 210 is shown with optical source 250, camera 260, and indicator 270. Camera 260 detects any aspect of the surface 390 within its field of view 370. In FIG. 3B, the camera 260 detects at least a portion of an object 350 on the surface 390. Such an arrangement of a camera 260 built within a computer input device 210 allows for a user to take a snapshot of anything within the field of view of the camera. Such a case may include a computer input device with a higher resolution camera 260, but such an arrangement is not necessary and it should be understood by those skilled in the art that any type of camera or image detection apparatus may be utilized.

In FIG. 3B, the computer input device 210 includes a power source 310, the optical source 250, an activation switch 320, electronics 330, and warning indicator 270. In this embodiment, when the activation switch 320 is closed, a snapshot of the image within the field of view 370 of the camera 260 is taken. The computer input device 210 of FIG. 3B may be used to capture and digitize the contents of a surface. Such a method of capturing and digitizing includes the standard operating functions of a camera.

FIG. 4 is a schematic diagram of an illustrative embodiment of a computer input device tracking system with a surface in accordance with at least one aspect of the present invention. The computer input device tracking system 400 can be designed to allow for multiple computer input devices, 210a, 210b, and 210c, to operate simultaneously. As shown in FIG. 4, computer input devices 210a, 210b, and 210c, each transmit an optical output 360a, 360b, and 360c, respectively. The cameras 260a, 260b, and 260c (not shown), each have a field of view, 370a, 370b, 370c, that cover a surface 410 or part of a surface 410. In FIG. 4, surface 410 could be a dry erase whiteboard. Computer input devices 210a and 210b are shown on a tabletop 490. Computer input device 210c is shown in an arrangement when a user might be standing or actually conducting a presentation. Further, computer input devices 210a and 210c are connected to computer 430 via a wireless connection, while computer input device 210b includes a wired connection 450 to the computer 430. In the embodiment shown in FIG. 4, surface 410 is not an interactive surface. Surface 410 does not communicate with computer 430.

Methods of differentiating each of the points of contact of the optical outputs 360a, 360b, and 360c, include detecting a different color, a different beam shapes, i.e., shape of the light upon imaging with surface), the timing of the position change, or a correlated position that is calculated by an algorithm, among other methods. One such method is described below with reference to FIGS. 9 and 10. For image based algorithms, any type of camera, including conventional complementary metal oxide semiconductor (CMOS) and charge coupled device (CCD) type cameras, can be utilized. For an intensity threshold algorithm, conventional cameras with filters, to allow passage of only the stronger radiation from a light source, or radiation-sensitive detectors, such as a position sensitive photodetector, can be utilized.

FIG. 4 shows a further aspect of the present invention. A video projection system 420 can project the display of a computer or some other image. The video projection system 420 is configured to project a display covering an area 440 that is the same as the field of view 370a, 370b, and 370c of each of the camera 260a, 260b, and 260c, within the computer input devices 210a, 210b, and 210c, respectively. It should be understood by those skilled in the art that the field of view 370 of the cameras also may be larger or smaller than the projected display 440. In one example, the video projection system 420 can project an interactive application program. In another example, the video projection system 420 can project the current content of a display of a computer 430. As such, an optical output 360a, 360b, 360c, could be interpreted as a command to implement an operation within the interactive program. Utilizing the spatio-temporal information of the point of contact of the optical output, a fuzzy matching technique such as dynamic programming can be used to interpret the optical output command as one of a predefined set of actions. For example, a motion of the point of contact of the optical output in the form of a check gesture could be interpreted to mean "save", while a cross gesture could be interpreted to mean "delete." Although not shown in the embodiment illustrated in FIG. 4, the surface 410 could be any of a variety of surfaces, allowing multiple users of computer input devices to interact with and be tracked by their respective cameras. Such a use may occur during a presentation when a presenter may wish to underline a word that is projected onto the surface.

FIG. 5 is a schematic diagram of an illustrative embodiment of a computer input device tracking system with an interactive surface in accordance with at least one aspect of the present invention. The computer input device tracking system 500 is similar to the system as shown in FIG. 4, except that surface 510 is an interactive surface. Surface 510 communicates with computer 430 via a communication path 520. Interactive surface 510 allows for greater flexibility in handling more types of applications that may be operating on the computer 430. For example, an interactive surface 510 allows a user to operate an input device 210a to track the position of optical output, while allowing the interactive surface 510 to change a function, such as zooming the image, simultaneously.

Because the video projector and the camera cannot be positioned physically at a single point, what the camera sees is different from what the video projector projects. In fact, each computer input device 210 sees the projected display from a different position or angle. The difference must be pre-calibrated. Various methods are known in the art for accomplishing this calibration. One method is to project a known pattern and to determine the camera-projector relationship by comparing the projected pattern and the acquired image by the camera. Another method provides for tracking and detecting the working field in the image at each time instance so the transformation between the camera and the working field in space is computed and represented as a 3×3 matrix. The point of contact of the optical output is detected and tracked in the image at each time instance. The corresponding coordinates in the working field of the point of contact can be computed by mapping the point of contact with the computed 3×3 matrix computation.

FIGS. 6A and 6B illustrate two types of computer input devices 600. In FIG. 6A, a computer input device 600 is shown with an outer housing 610, a tip 640, and a power source 310. The computer input device 600, as shown in FIG. 6A, could be a standard computer pen. The computer input device 600 further includes an optical port 630 and a camera port 620. Camera port 620 is the window through which the camera 260 operates. The optical port 630 is the window through which the optical output 360 is transmitted. Camera port 620 is configured to have the entire working field within its field of view.

The computer input device 600 shown in FIG. 6B illustrates another embodiment of a type of computer input device 600 in accordance with at least one aspect of the present invention. The computer input device 600 in FIG. 6B includes an activation switch 320, a power source 310, an optical source 250, a camera 260, a camera port 620, an optical port 630, and a tip 640. The computer input device 600 also includes a reflector 670 to reflect the optical output 360 from the optical source 150 through the optical port 630. Various types of optical output sources 150 may be utilized, including a laser diode or a light emitting diode that operates within the visible spectrum (400-760 nm) or the infrared spectrum (>760 nm), an edge emitting laser, vertical cavity surface emitting laser diode, or resonant cavity light emitting diode. In addition, various colors of optical output, at least within the visible spectrum, may be used. Other characteristics of the optical output 360 may be used to differentiate various computer input devices, including, but not limited to, the intensity of the optical output 360, whether the optical output 360 is pulsing, the size of the point of contact 380 against a surface, the color, the shape, and the signal amplitude of the optical output 360. A user can set the threshold of the camera so that only signals from optical sources with sufficient radiation intensity will register the detector of the camera. This can alternatively be achieved digitally by software.

The activation switch 320 is shown as a push type switch; however, a multitude of different types of activation switches could be used. Further, the position of the activation switch is not limited to the one illustrated in FIG. 6B. In addition, the tip 640 could act as the activation switch for the computer input device 600. The activation switch 320 enables the computer input device 600 to transmit the optical output 360, or, alternatively, to secure an image as seen by the camera 260 through the camera port 620. The optical output 360 is transmitted through optical port 630. The configuration of the computer input device 600 allows for multiple activation switches 320. The tip 640 could be a transparent housing allowing an optical output 360 to radiate throughout. It should be understood by those skilled within the art that the activation switch 320 is not necessary as the pointing device 600 could be designed to constantly transmit an optical output 360, or secure an image as seen by the camera 260 through the camera port 620.

The pointing device 260 in FIG. 6B could be configured to permit the optical output 360 to pass through the tip 640 of the computer input device 600. In such a configuration, the computer input device 600 could act as a typical writing/drawing implement, permitting a user to input digital ink.

Figure 7A:
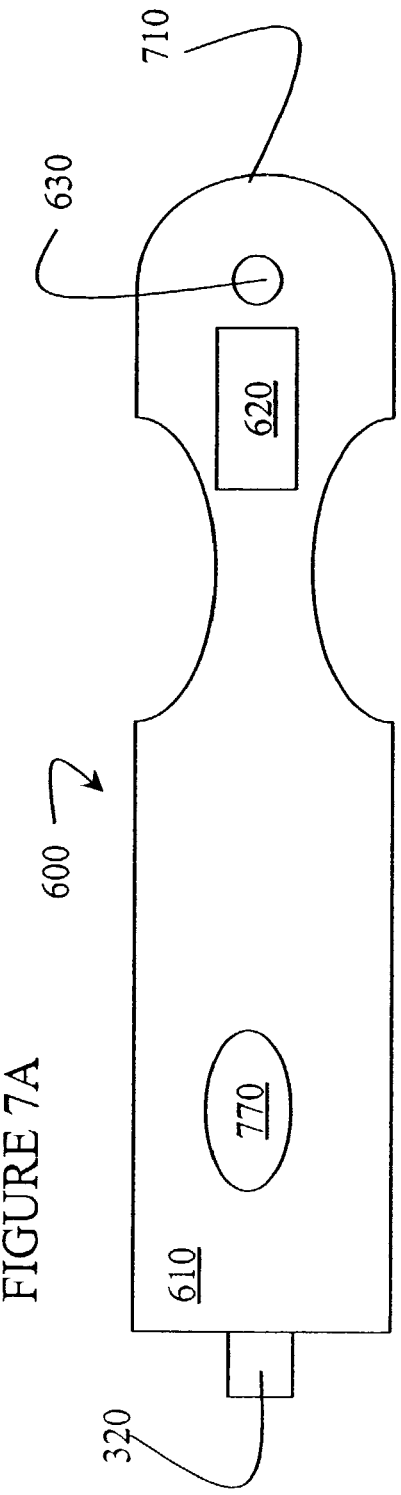
FIGS. 7A-7B are schematic diagrams of illustrative embodiments of computer input devices with various types of housings in accordance with at least one aspect of the present invention.
Figure 7B:
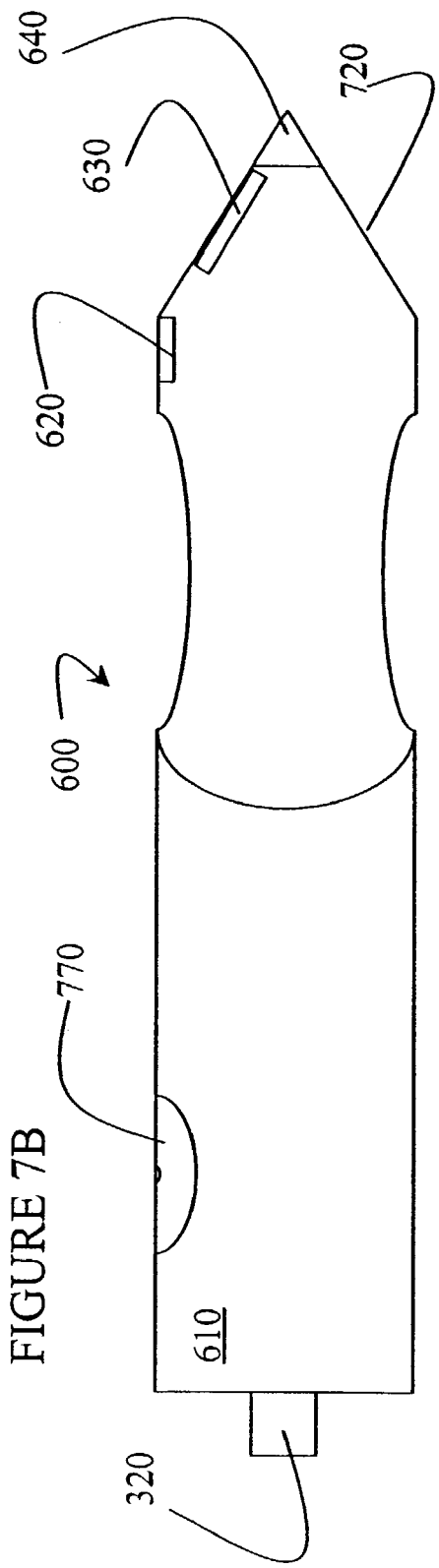

Referring now to FIGS. 7A and 7B, illustrative embodiments of computer input device 600 are shown. In FIG. 7A, computer input device 600 is shown with a housing 610, camera port 620, optical port 630, indicator port 770, and activation switch 320. The computer input device 600 in FIG. 7A has a housing 610 specifically configured to be an ergonomic design. In addition, one end of the computer input device 600 has a rounded tip 710. In FIG. 7B, computer input device 600 includes a housing 610, camera port 620, optical port 630, indicator port 770, and activation switch 320. The pointing device 600 in FIG. 7B has a housing 610 specifically configured to be an economic design. In FIG. 7B, one end of the pointing device 600 has a pointed tip 720. The computer input devices 600 as shown in FIGS. 7A and 7B may be used to make physical contact with a surface in a similar fashion as a pen, a pencil or a computer stylus. It should be understood by those skilled in the art that the camera port 620 may be positioned at an opposite end of the computer input device 600 from the optical port 630 in order to permit the camera to sense the full view of the working surface upon which the computer input device is operating.

Figure 8:
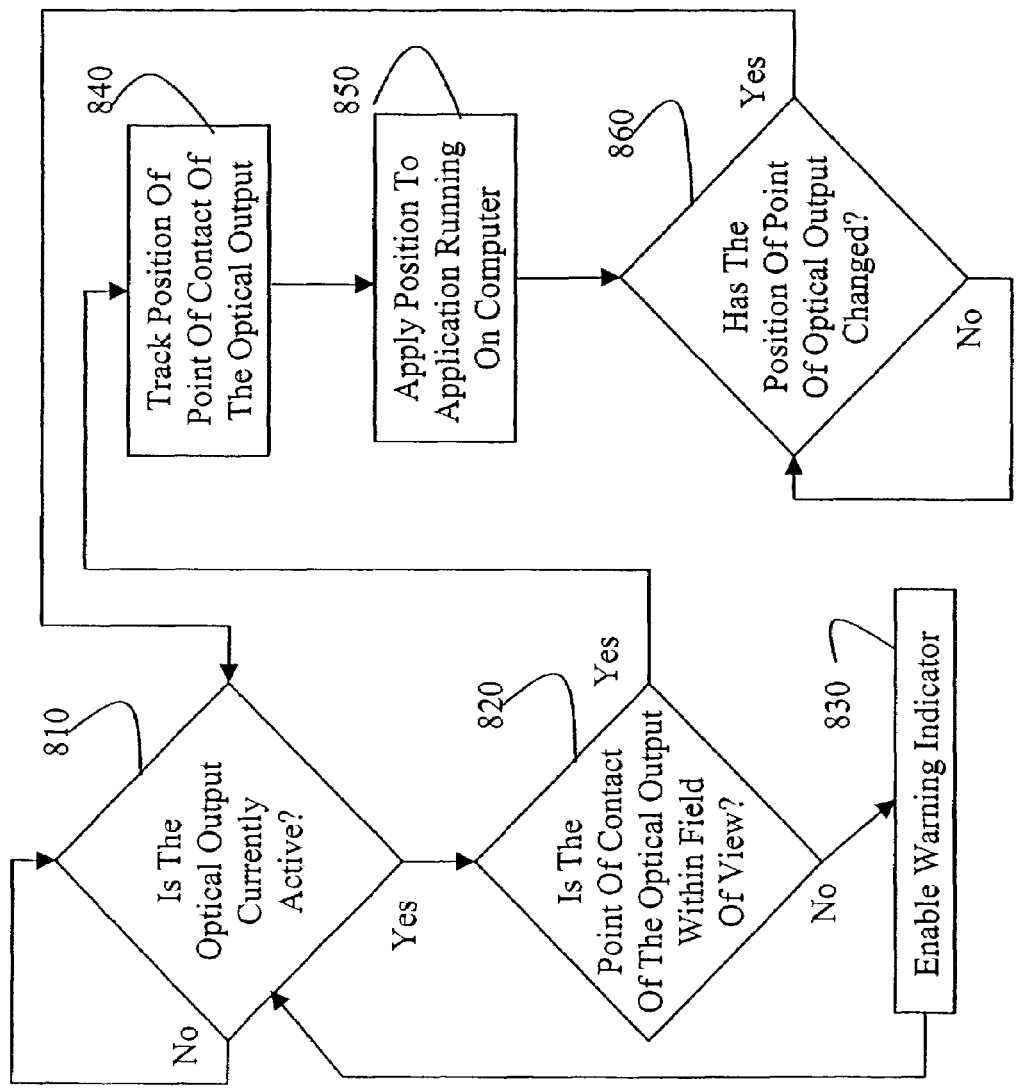
FIG. 8 is a flow chart of an illustrative method for tracking a point of contact of an optical output from a computer input device by use of a self-contained camera in accordance with at least one aspect of the present invention.

FIG. 8 is a flow chart of an illustrative method for tracking a point of contact of an optical output from a computer input device by use of a self-contained camera in accordance with at least one aspect of the present invention. At step 810, a determination is made as to whether the optical output is currently active, i.e., is currently being transmitted. If the optical output is not currently active, the process begins again at step 810. If the optical output is currently active, at step 820, a determination is made as to whether the point of contact of the optical output is within the working field. If the point of contact of the optical output is not within the working field, an indicator is enabled at step 830 and the process returns to step 810.

If the point of contact of the optical output is within the working field, the position of the point of contact of the optical output is tracked at step 840. At step 850, the position of the point of contact is applied to an application running on a computer. Finally, at step 860, a determination is made as to whether the position of the point of contact of the optical output has changed. In the event that the feature has not changed position, the process repeats step 860. In the event that the position of the point of contact of the optical output has changed, the process returns to step 810.

There are various methods for the detection of a point of contact of an optical output from a computer input device. Three methods are described below. The first method is based on color classification. Initially, a color model for the work surface and each optical output is built. A color model can be represented by Gaussian model. To build the color model for the work surface, the projector projects various contents on the work surface without the use of an optical output, and the camera captures those images, which are then analyzed. One method of capturing the images by the camera is to have the cause the optical output to pulse as it is transmitted to the surface. To build the color model for the point of contact of each optical output, the point of contact of the optical output is placed at various positions on the work surface, and the captured images are analyzed. Next the points of contact of the optical outputs are identified in the video image in real time. Comparing each pixel with the color models, as described below does such a process. If the pixel color belongs to the point of contact of a particular optical output color model, that pixel is identified as the position of the point of contact of the corresponding optical output from the particular computer input device. Because of the size of the point of contact, several neighboring pixels may be identified as the position of the point of contact of the optical output, and they can be used, i.e., the centroid, to obtain a subpixel accuracy. Post-processing such as morphological operations can be applied to remove the noise.

The second method is based on image subtraction. At each instant, the system knows the content of the work surface, so it knows what the camera is expected to see, which is the projected image. The actual image acquired by the camera may be different because of placements of the point of contact of the optical outputs. By subtracting the projection image from the actual image, the point of contact of the optical output and can be identified in the difference image. In an order to identify the identity of each point of contact, the color is compared with the color model for each optical output. In the color model of each optical output is built in the same way as in the color classification model.

The third method is based on a radiation intensity threshold. In a radiation intensity based threshold method, the camera signal is only responding to the stronger light source signals. The signal amplitude is the relevant feature being tracked by this method. For example, such a method may be utilized for infrared application with an infrared filter utilized with the camera, among other uses.

Figure 9:
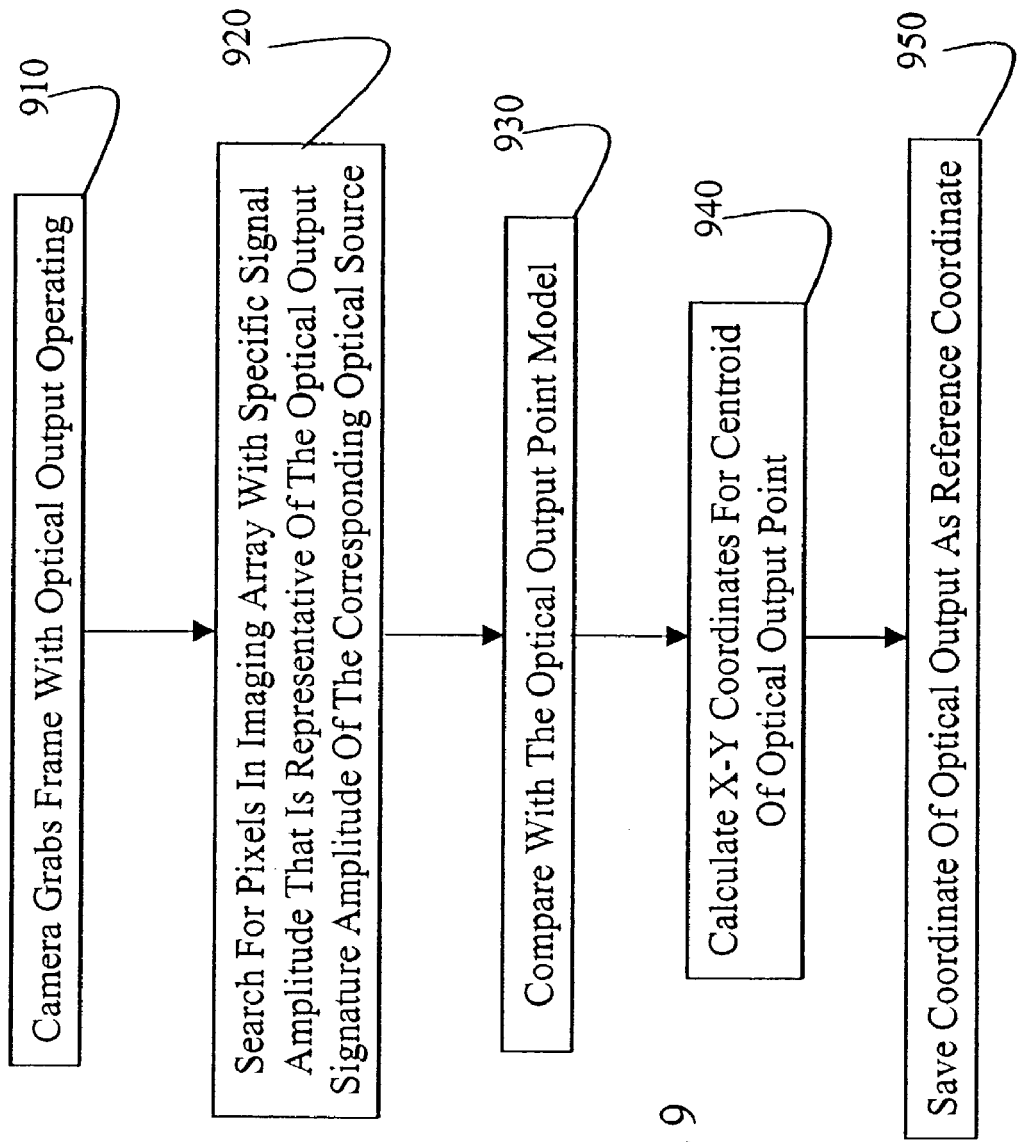
FIG. 9 is a flow chart of an illustrative method for calculating a reference coordinate of a point of contact of an optical output from a computer input device in accordance with at least one aspect of the present invention.
Figure 10:
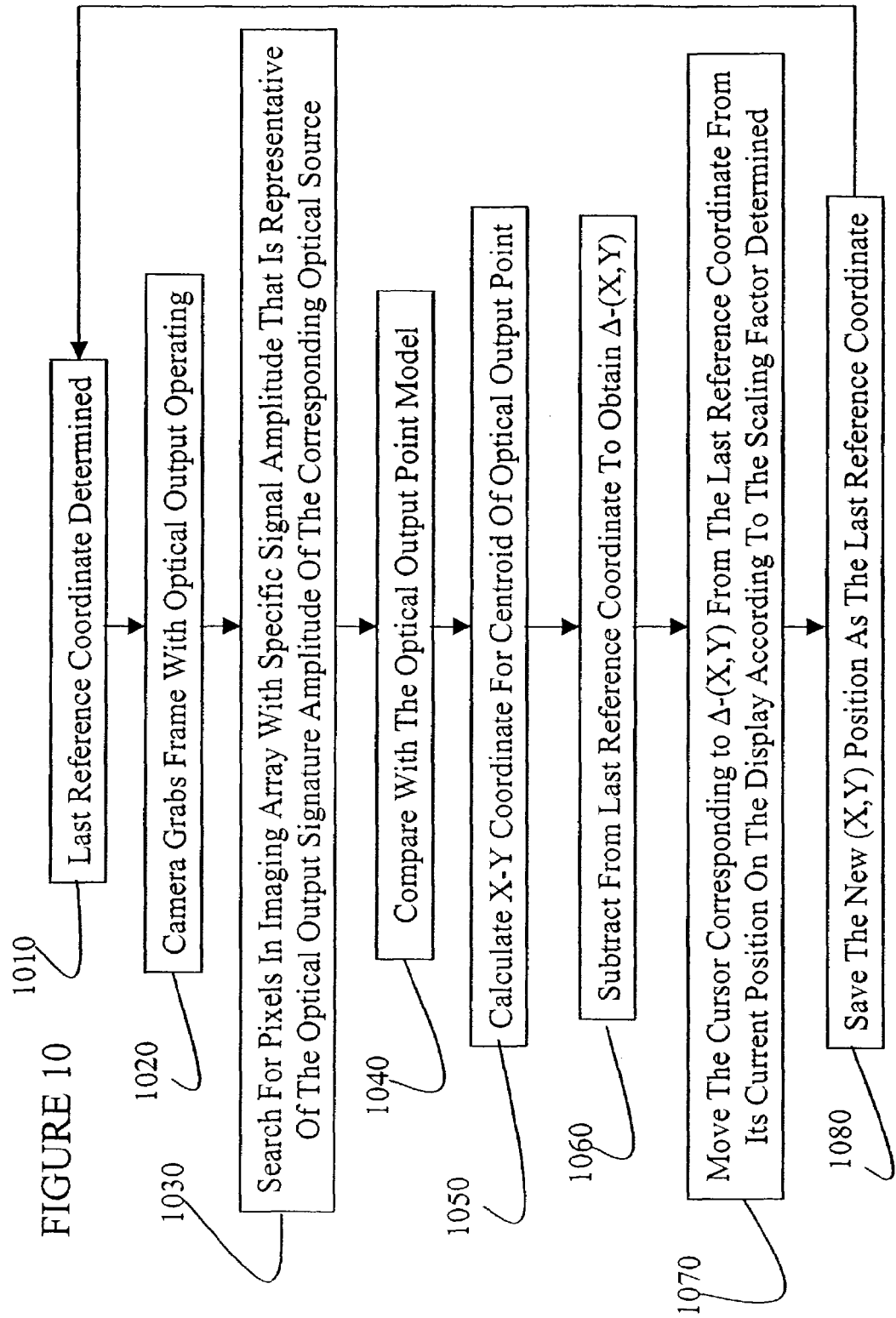
FIG. 10 is a flow chart of an illustrative method for tracking an optical output from a computer input device in accordance with at least one aspect of the present invention.

FIG. 9 is a flow chart of an illustrative method for calculating a reference coordinate of a point of contact of an optical output from a computer input device in accordance with at least one aspect of the present invention. FIG. 10 is a flow chart of an illustrative method for tracking an optical output from a computer input device in accordance with at least one aspect of the present invention. FIGS. 9 and 10 are but one method for identifying and tracking points of contact of optical outputs.

At step 910, the camera grabs the frame with the optical output operating, i.e., the camera has a field of view over a surface with the optical output currently operating. At step 920, the camera will search for pixels in the imaging array with a specific signal amplitude that is representative of the optical output signal amplitude of the computer input device including both the camera and the optical source. At step 930, for the group of pixels identified, a comparison is made with a point model, i.e., using correlation metrics. Next, at step 940, the X-Y coordinate for the centroid of the optical output point is calculated. Finally, at step 950, the X-Y coordinate of the point of contact of the optical output is stored as a last reference coordinate. Now, the initial reference coordinate for the point of contact for the optical output is configured within the camera.

Once a point of contact of an optical output is detected, it is tracked over time using a Kalman function until it disappears. Through tracking, higher accuracy of the point of contact of the optical output is obtained, in addition to the velocity of the movement of the point of contact of the optical output. Once the initial reference coordinate has been determined, the process moves to FIG. 10. At step 1010, the reference coordinate has been calculated. At step 1020, the camera, again, grabs the frame with the optical output operating. At step 1030, the camera will search for pixels in the imaging array with the specific signal amplitude that is representative of the optical output signal amplitude of the corresponding computer input device. Next, for the group of pixels identified, a comparison is made with the point model at step 1040.

At step 1050, the X-Y coordinate for the centroid of the point of contact of the optical output is calculated. At step 1060, the X-Y coordinate is subtracted from the last reference coordinate to obtain Δ-(X,Y). At step 1070, a cursor is moved corresponding to Δ-(X,Y) from the reference coordinate from the cursor's current position on a display according to a scaling factor determined. A scaling factor will determine the ratio of the detected relative difference within the field of view of the camera and the actual physical difference on the surface. Finally, at step 1080, the new (X,Y) position is stored as the last X-Y reference coordinate. Once again, it should be understood by those skilled within the art that this process is but one process for tracking an optical output against a surface. It should be understood that the same method could be used for multiple computer input devices operating in this fashion simultaneously.

In addition to a relative algorithm such as described in FIGS. 9 and 10, absolute tracking can occur by calculation of the absolute X-Y positions on a reference surface and directing the light spot to shine to the corresponding location. Still further, the camera tracking system can utilize algorithms to capture the corresponding views and correct for distortion when camera views related to device orientation are changed with respect to the working surface.

FIG. 11 is a schematic diagram of an illustrative embodiment of an optical output device camera tracking systems for use with a computer application in accordance with at least one aspect of the present invention. FIG. 11 shows a display 1120 that is coupled to a computer, not shown. A surface 1110 is shown, that could include a projector screen or wall, among other surfaces. Projected onto the surface 1110 is an image, not shown, that corresponds to the image provided on the display 1120. The surface 1110 further includes a working field 1160. The working field 1160 is the active field for the camera, contained within the computer input device 1130, to sense an optical output 1140. FIG. 11 further shows a computer input device 1130. The computer input device 1130 has a field of view, not shown. In this illustration, the camera is configured to sense the boundaries of a predefined working field 1160 when the boundary is within the field of view of the camera. In FIG. 11, a relative movement in the position of a cursor position is shown. An application operating on a computer coupled to the computer input device 1130 and display 1120 could be an application that permits movement of a cursor. The cursor begins at position C1. The corresponding location within the display 1120 is shown. If the computer input device 1130 moves the optical output 1140 to a different location, C2, within the working field 1160, the camera visually tracks the movement of the optical output 1140 and moves the cursor position on the display 1120 in response to position C2. The computer can calculate the change in position based upon some difference in time and position.

A mode activation switch 1150 is also shown. The mode activation switch 1150 allows a computer input device to be used in a variety of operating modes. In one mode, the optical output and/or camera can be utilized for mouse translation movement relative to a support surface that it is resting upon. In a second mode, the optical output and/or camera can be utilized for "point and click" applications or image scanning applications, among others. In a third mode, a combination of the two modes can be utilized simultaneously. The activation mode switch 1150 could be designed to have a depression switch.

Figure 12B:
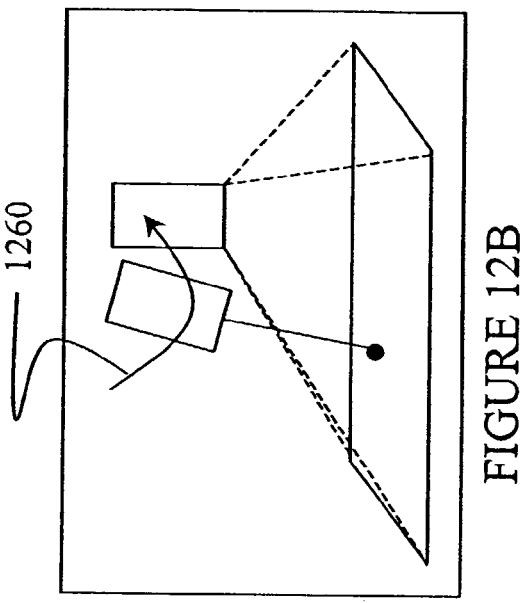
FIGS. 12A to 12C are schematic diagrams of an illustrative embodiment of an optical output device camera tracking system in accordance with at least one aspect of the present invention.
Figure 12A:
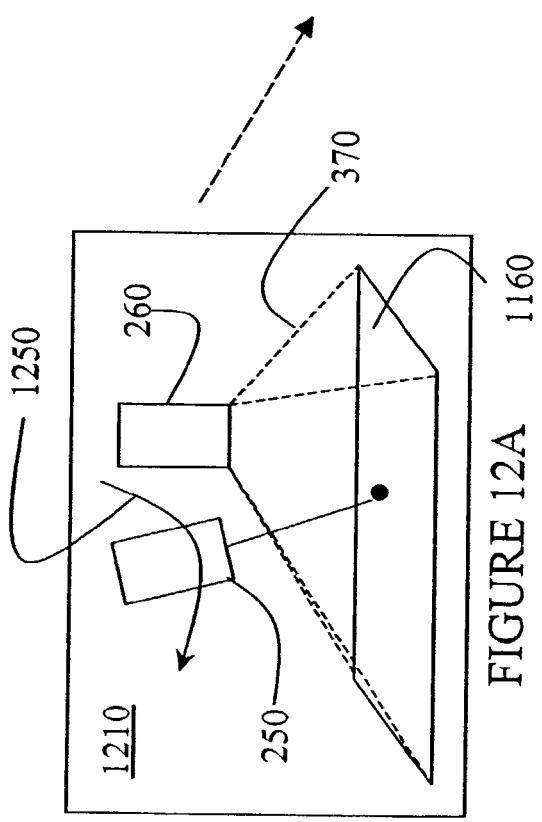
Figure 12C:
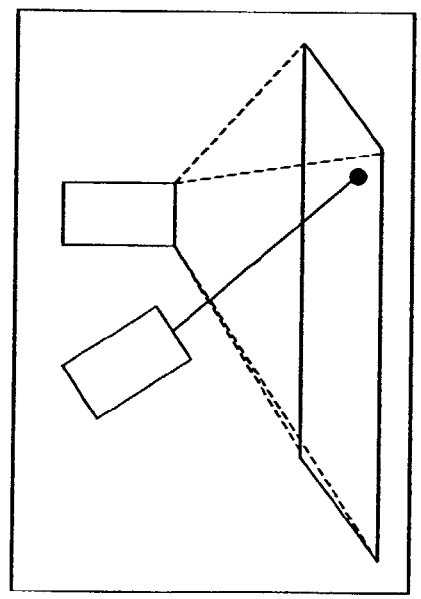

FIGS. 12A to 12C are schematic diagrams of an illustrative embodiment of an optical output device camera tracking system in accordance with at least one aspect of the present invention. FIGS. 12A to 12C illustrate a self-contained system in which a working surface 1160, an optical source 250, and a camera 260 are contained within a common housing 1210 of the computer input device. Camera 260 has a field of view 370 of the entire working surface 1160. In this example, the computer input device could be a joystick. External control of the computer input device controls the X, Y, and Z movements of the optical source 250, such as by rotation. In FIG. 12A, optical source begins in a first position with an optical output being transmitted and tracked against the working surface 1160 by the camera 260. Arrow 1250 represents a movement of the optical source 250, such as movement of a joystick in a particular direction. FIG. 12B illustrates the new position of the optical source 250 and point of contact of its optical output against the working surface 1160 being tracked by the camera 260. Arrow 1260 represents another movement of the optical source 250. FIG. 12C illustrates the new position of the optical source 250 and point of contact of its optical output against the working surface 1160 being tracked by the camera 260. In each illustration, the camera 260 senses the projection of the optical output with respect to the working surface 1160 and calculates the X-Y coordinates. In addition, the Z-coordinate can be calculated. One technique for calculating the Z-coordinate includes imaging the Z-distance between the tip of the optical source 250 and the working surface 1160. Another technique utilizes a Doppler beat signal of a laser source when Z-movement is introduced, i.e., self-mixing related Doppler beat in edge emission or vertical cavity surface emission lasers.

While illustrative systems and methods as described herein embodying various aspects of the present invention are shown, it will be understood by those skilled in the art, that the invention is not limited to these embodiments. Modifications may be made by those skilled in the art, particularly in light of the foregoing teachings. For example, each of the elements of the aforementioned embodiments may be utilized alone or in combination or subcombination with elements of the other embodiments. It will also be appreciated and understood that modifications may be made without departing from the true spirit and scope of the present invention. The description is thus to be regarded as illustrative instead of restrictive on the present invention.

We claim:

1. A method for tracking a point of contact of an optical output of a computer input device having a housing with a wall portion and a base portion, the base portion disposed to support the computer input device on a support surface, the method comprising steps of:

transmitting an optical output from the computer input device, the optical output transmitted through the wall portion of the housing of the computer input device;

tracking a position of the point of contact of the optical output on an interactive surface in communication with a computer, when the optical output is within the field of view of a camera contained within the computer input device, wherein the interactive surface enables tracking the position of the point of contact of the optical output while simultaneously changing a computer function, the computer function comprising zooming an image, and wherein the field of view senses a working field comprising at least one boundary, the working field further comprising an active area of sensing for the camera;

transmitting the position of the point of contact of the optical output to the computer;

applying the position of the point of contact of the optical output as an input to an application operating on the computer;

determining whether the optical output is being transmitted by the computer input device;

determining whether the point of contact of the optical output is within the working field; and enabling a warning indicator upon determining that the point of contact is not within the working field, wherein the point of contact is not within the working field upon the at least one boundary being passed through when the optical output starts from within the field of view of the camera, and wherein the warning indicator comprises an audio/visual indicator indicating that the working field is no longer in the field of view of the camera.

2. The method of claim 1, further comprising a step of determining whether the position of the point of contact of the optical output has changed.

3. The method of claim 2, upon determining that the position of the point of contact of the optical output has changed, the method further comprising steps of:

determining whether the optical output is being transmitted;

determining whether a new point of contact of the optical output is within the field of view of the camera; and tracking a position of the new point of contact of the optical output.

4. The method of claim 1, wherein the step of determining comprises a step of identifying a characteristic of the optical output.

5. The method of claim 4, wherein the characteristic of the optical output is one of: intensity, a pulsing, a size of the point of contact, a color, a shape, and a wavelength.

6. The method of claim 4, wherein the step of tracking comprises a step of calculating an X-Y coordinate for a centroid of the point of contact of the optical output based upon the identified characteristic.

7. The method of claim 6, wherein the step of applying comprises steps of:
  subtracting the X-Y coordinate from a reference coordinate;
  moving a cursor corresponding to the subtracted coordinate from the reference coordinate; and
  saving the subtracted coordinate as the reference coordinate,
  wherein the X-Y coordinate is the position of the optical output.

8. The method of claim 1, wherein the application is a cursor position.

9. The method of claim 8, further comprising a step of displaying the cursor position on a display responsive to the applying step.

10. The method of claim 1, further comprising a step of initiating a second application in response to a predefined motion of the optical output.

11. The method of claim 1, further comprising a step of detecting movement of the computer input device relative to the support surface.

12. A system for tracking motion of an optical output of a computer input device, the system comprising:
  a computer input device, the computer input device comprising:
    a housing having a base portion and a wall portion, the base portion disposed to support the computer input device on a surface;
    an optical source disposed to transmit light through the wall portion of the housing, and a camera, configured to track a position of a point of contact of an optical output from the optical source when the optical output is within a field of view of the camera, wherein the field of view senses a working field comprising at least one boundary, the working field further comprising an active area of sensing for the camera; and
  an interactive surface configured to display an application operating on a computer; and
  a computer, coupled to the computer input device and the interactive surface, configured to receive the position of the point of contact of the optical output, to apply the position as an input to an application operating on the computer, to determine whether the optical output is being transmitted by the computer input device, to determine whether the point of contact of the optical output is within the working field, and to enable a warning indicator upon determining that the point of contact is not within the working field, wherein the point of contact is not within the working field upon the at least one boundary being passed through when the optical output starts from within the field of view of the camera, and wherein the warning indicator comprises an audio/visual indicator indicating that the working field is no longer in the field of view of the camera.

13. The system of claim 12, wherein the camera is configured to transmit the position, wherein the input corresponds to an input of digital ink.

14. A computer mouse, comprising:
  a housing having a base portion and a wall portion, the base portion disposed to support the computer mouse on a supporting surface;
  an optical source disposed to transmit light through the wall portion of the housing;
  a camera, disposed to receive images through the wall portion of the housing, configured to point in the same direction as the optical source so that the camera can detect an image impinged on a surface from light from the optical source, to track a position of a point of contact of an optical output from the optical source when the optical output is within a field of view of the camera, wherein the field of view senses a working field comprising at least one boundary, the working field further comprising an active area of sensing for the camera;
  a button to activate the optical source to transmit; and
  a warning indicator,
  wherein the warning indicator is activated upon determining that a point of contact of an output of the optical source is not in a working field, wherein the point of contact is not within the working field upon the at least one boundary being passed through when the optical output starts from within the field of view of the camera, and wherein the warning indicator comprises an audio/visual indicator indicating that the working field is no longer in the field of view of the camera.

* * * * *